(12) United States Patent
Foong

(10) Patent No.: US 6,980,133 B2
(45) Date of Patent: Dec. 27, 2005

(54) USE OF TWO INDEPENDENT PEDALS FOR A FOOT-OPERATED MOUSE

(75) Inventor: Annie P. Foong, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 565 days.

(21) Appl. No.: 10/053,608

(22) Filed: Jan. 24, 2002

(65) Prior Publication Data

US 2003/0137436 A1 Jul. 24, 2003

(51) Int. Cl.$^7$ .......................................... H03M 11/00
(52) U.S. Cl. ......................... 341/20; 341/21; 345/157; 400/273
(58) Field of Search ................. 341/20, 21; 345/157, 345/159, 184; 400/273

(56) References Cited

U.S. PATENT DOCUMENTS

| | | | | |
|---|---|---|---|---|
| 4,670,738 A | * | 6/1987 | Weinblatt | ...................... 341/20 |
| 5,552,807 A | * | 9/1996 | Hayes et al. | .................. 345/156 |
| 5,635,957 A | * | 6/1997 | Feierbach et al. | ........... 345/163 |
| 5,745,055 A | | 4/1998 | Redlich et al. | |
| 5,838,305 A | | 11/1998 | Bookstein | |
| 5,841,426 A | | 11/1998 | Dodson et al. | |
| 5,864,333 A | * | 1/1999 | O'Heir | ........................ 345/157 |
| 5,886,685 A | * | 3/1999 | Best | ............................ 345/163 |
| 5,907,318 A | * | 5/1999 | Medina | ....................... 345/163 |
| 6,611,250 B1 | * | 8/2003 | Prince et al. | ................ 345/163 |

OTHER PUBLICATIONS

Hunter Digital, Oct. 1, 1995, <http://www.footmouse.com/pr_rls.htm>.

* cited by examiner

Primary Examiner—Timothy Edwards, Jr.
(74) Attorney, Agent, or Firm—Kenyon & Kenyon

(57) ABSTRACT

A device and method for operating and controlling a cursor by a foot. The foot-operated input control device includes a first pedal for controlling a cursor along an x-axis and a second pedal for controlling a cursor along a y-axis. The first pedal is supported by a first base and further connected to a first motion detector which determines an angular motion of the first pedal. The second pedal is supported by a second base and further connected to a second motion detector which determines an angular motion of a second pedal. The angular motion of the first and second pedals are combined together and translated into the direction and velocity of motion of the cursor on a screen.

16 Claims, 3 Drawing Sheets

USE OF TWO INDEPENDENT PEDALS FOR A FOOT-OPERATED MOUSE

BACKGROUND OF THE INVENTION

1. Technical Field

The present invention generally relates to a foot-operated cursor control input device. More particularly, the invention relates to a foot-operated cursor control input device using two independent pedals.

2. Background

A hand-operated mouse has been the most widely employed and the most often used among many other computer peripherals. With the use of the hand-held operated mouse, many computer users have realized the significance of the "travel time" it takes to move the hand and eyes among a keyboard, a monitor and a mouse. Also, many users of the hand-held operated mouse suffer from carpal tunnel syndrome associated with stress on the delicate hand-wrist area and desktop mice.

A few attempts have been made to address the aforementioned problems by providing a foot-operated mouse. For example, U.S. Pat. No. 5,886,685 issued to Best on Mar. 23, 1999 and U.S. Pat. No. 5,745,055 issued to Redlich et al on Apr. 28, 1998 disclose foot-operated mice, and each are direct duplication of the desktop hand-held operated mouse with adapters and minor modifications. In these designs, the user's foot and toe are expected to duplicate the motion of the fingers for mouse movements and mouse button clicks. Another type of foot-operated mice incorporates belly-up mouse designs. In these designs, a conventional mouse is turned upside down and mounted to a sturdy footrest. The sole of the feet is used as a substitute for a mouse pad. One foot controls the cursor movement, while the other foot or toe controls the mouse buttons. However, all of these designs require that the human feet and toes exercise the same dexterity and fine motion as the user's hands and fingers. Accordingly, these foot-operated mice render them unwieldy and less attractive for everyday use.

Improvements of these designs have been suggested to reduce the awkwardness and discomfort in the use of foot-operated mice by introducing rail systems and sockets. U.S. Pat. No. 5,552,807 issued to Hayes et al on Sep. 3, 1996 discloses a foot-operated mouse. U.S. Pat. No. 5,838,305 issued to Bookstein on Nov. 17, 1998 discloses a computer game input control device for emulating the throttle and brakes in cars and planes. Both of these input control devices employ a sliding system set on rails that facilitates the use of both feet to provide x-y movement of a cursor in the Cartisian coordinate. Similarly, U.S. Pat. No. 5,841,426 issued to Dodson et al on Nov. 24, 1998 uses a socket pivot motion to provide the same motion as the desktop mouse. However, even these improvements are based on the premises that the foot-operated mice must mimic the motion of the desktop hand-operated mouse. Thus, these foot-operated mice have been designed with a lot of design limitations. For example, all of the aforementioned foot-operated mice or input control devices require 360-degree circular movement of the lower limb joints (e.g. toes, ankles, knees and hips) which may causes extreme fatigue on the limbs and lower back.

BRIEF DESCRIPTION OF THE DRAWINGS

The various advantages of the present invention will become apparent to one skilled in the art by reading the following specification and appended claims, and by referencing the following drawings, in which:

DETAILED DESCRIPTION

In accordance with one embodiment of the present invention, a cursor control apparatus is provided for reducing or eliminating the need to move the hand from the keyboard to a mouse. The apparatus includes a first pedal for controlling the movement of a cursor along an x-axis and a second pedal for controlling the movement of the cursor along a y-axis. Thus, the first and second pedals, in combination with each other, control the position of the cursor on a screen.

In accordance with another embodiment of the present invention, a method for controlling a cursor is provided. An angular motion of a first pedal, which controls the movement of a cursor along an x-axis, is determined. An angular motion of a second pedal, which controls the movement of the cursor along a y-axis, is also determined. The angular motion of the first and second pedals are then combined. The combined angular motion of the first and second pedals is translated into the velocity (speed and direction) of the cursor on a screen.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

Figure 1:
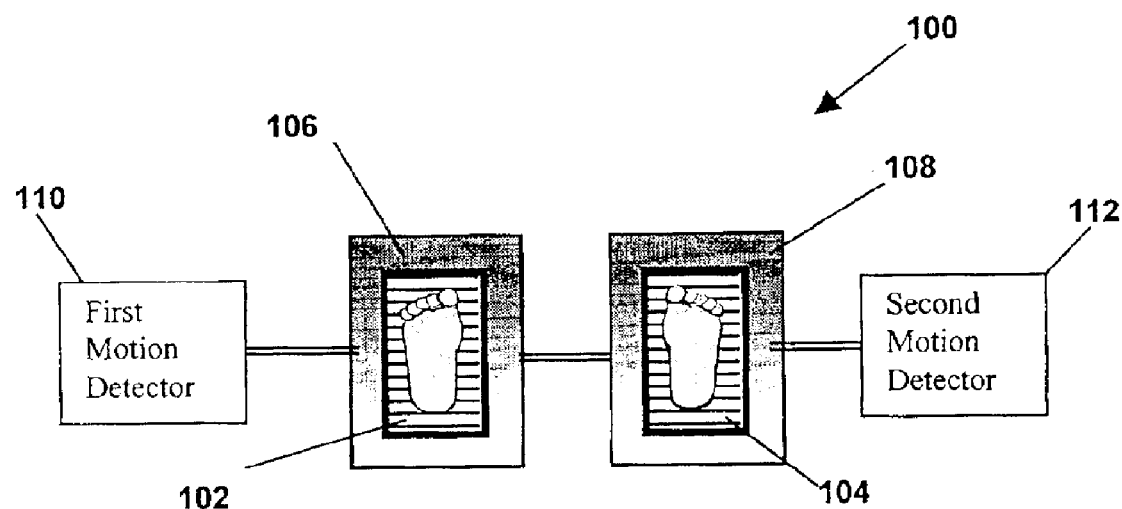
FIG. 1 is a top plan view of a foot-operated input control device using two independent foot pedals, in accordance with one embodiment of the present invention.
Figure 2:
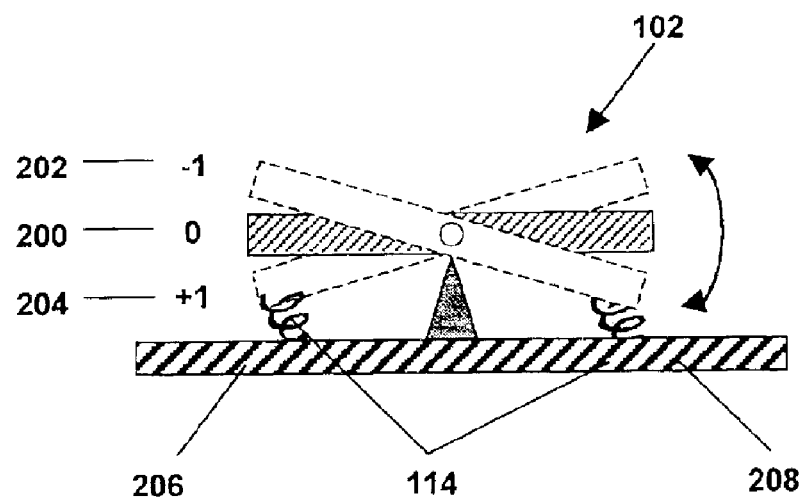
FIG. 2 is a side view of the foot-operated input control device depicting the angular motion of one of the foot pedals illustrated in FIG. 1, in accordance with one embodiment of the present invention.

FIG. 1 and FIG. 2 illustrate a top plan view and a side view of a foot-operated input control device 100, respectively, in accordance with one embodiment of the present invention. The foot-operated input control device 100 includes a first foot pedal 102 and a second foot pedal 104. The first foot pedal 102 is supported by a first pedal platform 106. A first pedal base 110 is mounted on the first pedal platform 106 and supports the first foot pedal 102 therefrom. The first pedal base 110 also facilitates pivoting motion of the first foot pedal 102. The first foot pedal 102, in combination with the first pedal platform 106 and the first pedal base 110, controls the movement of a cursor along an x-axis of a screen, a computer monitor, a interactive television program or the equivalents thereof. A pair of first springs 114 (FIG. 2) is also disposed between the first pedal platform 106 and the first pedal 102. One of the first springs 114 is disposed at a first end 206 of the first foot pedal 102. The other one of the first springs 114 is disposed at a second end 208 of the first foot pedal 102. The first springs 114 induce the first foot pedal 102 to return to its normal, or neutral, position automatically.

Likewise, the second foot pedal 104 is supported by a second pedal platform 108. A second pedal base (not shown) is mounted on the second pedal platform 108 and supports the second foot pedal 104 therefrom. The second pedal base also facilitates pivoting motion of the second foot pedal 104. The second foot pedal 104, in combination with the second pedal platform 108 and the second pedal base (not shown), controls the movement of the cursor along a y-axis of the given screen. The movements of the cursor along the x-axis and y-axis are then combined to control the movement of the cursor on the given screen. Also, a pair of second springs is also disposed between the second pedal platform 108 and the second pedal 104 in the same manner as the first springs 114 to induce the second pedal 104 to return to its normal, or neutral, position automatically.

With reference to FIG. 2, the operation of the foot-operated input control device 100 is described in greater detail. FIG. 2 illustrates the angular motion of only one of the foot pedals shown in FIG. 1, in accordance with one embodiment of the present invention. However, it should be understood that both the first and second foot pedals 102 and 104, respectively, operate in the same manner. The first and second foot pedals 102 and 104 pivot like a lever, or a seesaw. In particular, each of the first and second foot pedals 102 and 104 has three different positions, namely, a neutral or normal position 200, a forward or counter-clockwise position 202, and a backward or clockwise position 204. At rest, the first and second foot pedals 102 and 104, respectively, are in the neutral position 200. The user can simply push the first foot pedal 102 and the second foot pedal 104 forward and/or backward to control the movement of a cursor on the given screen.

The first and second foot pedals 102 and 104, respectively, are configured for motion to allow positive and negative velocities. More particularly, the neutral position 200 provides a zero velocity to the cursor. The forward position 202 provides a positive velocity, and the backward position 204 provides a negative velocity to the cursor. Each velocity represents movement of the cursor to a different direction in the x-y coordinates on the screen. For example, if the first and/or second foot pedals 102 and 104, respectively, are in the neutral position, the cursor stays at its current position along its associated axis on a given screen. If the first foot pedal 102 is in the forward position, the cursor moves to the right side of the screen. If the first foot pedal 102 is in the backward position, the cursor moves to the left side of the screen. Likewise, the cursor moves upward if the second foot pedal 104 is in the forward position, and the cursor moves downward if the second foot pedal 104 is in the backward position.

The degree of angular motion of the first foot pedal 102 and the second foot pedal 104 are separately measured as the user moves the foot pedals 102 and 104. In the one embodiment of the present invention, a first motion detector 110 measures the degree of angular motion of the first foot pedals 102. Likewise, a second motion detector 112 measures the degree of angular motion of the second foot pedals 104. In particular, the first and second motion detectors 110 and 112 measure the angular displacements of the first and second foot pedals 102 and 104, respectively, as well as how fast the user is moving the foot pedals. For the first and second motion detectors 110 and 112, the present invention employs an optical encoding disk widely used in conventional hand-held mice. However, the use of other well-known and readily available motion detectors can also be envisioned so long as they can monitor the angular displacement and speed of the foot pedals.

Figure 3:
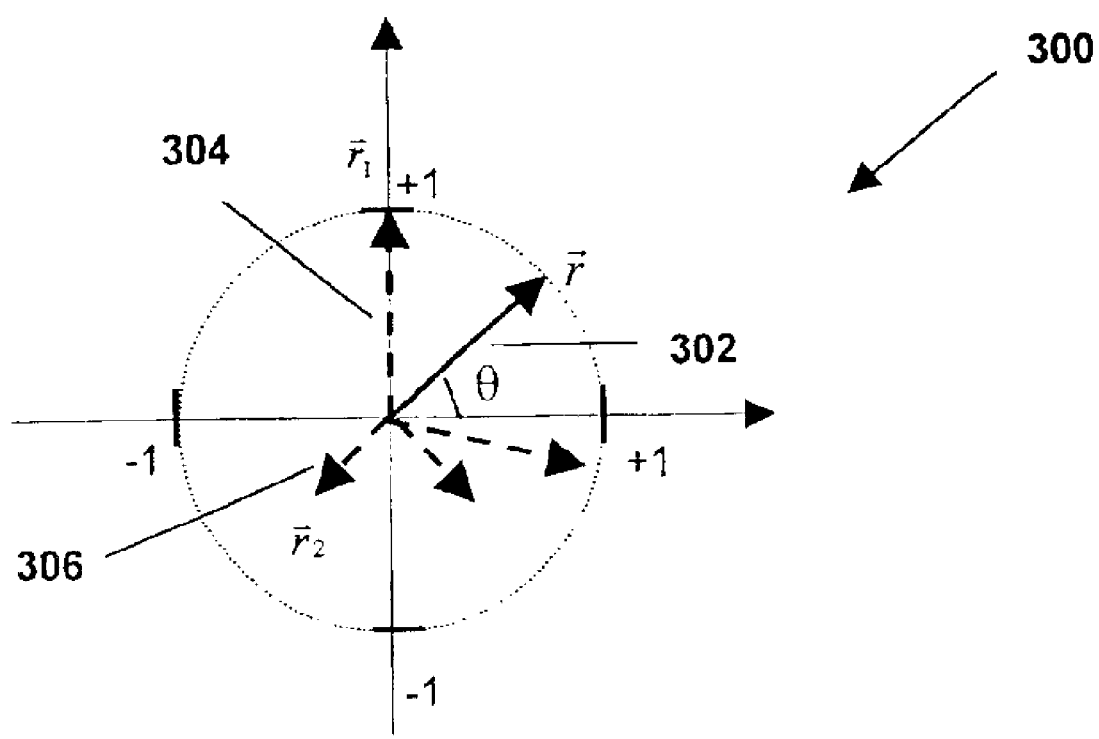
FIG. 3 is a graphical representation depicting exemplary movements of a cursor in the x-y coordinates, in accordance with one embodiment with the present invention.

The degrees of angular motion of the first foot pedal 102 and the second foot pedal 104 are then combined together. In one embodiment of the present invention, the combined angular motions of the foot pedals are subsequently translated into a velocity, or a direction and a speed, at which the cursor moves on the screen. The resultant combination of the degrees of angular motion of the first and second foot pedals 102 and 104 is a mouse velocity vector, $\vec{r}$ (FIG. 3). The mouse velocity vector, $\vec{r}$, denotes the speed and direction of the cursor. More specifically, when the degrees of angular motion are combined together, the angular displacements of the first and second foot pedals 102 and 104 are combined together as well as the speed at which the first and second foot pedals 102 and 104 are being depressed. The resultant combination of the angular displacements of the first and second foot pedals 102 and 104 represents the direction of the cursor movement on the given screen. The combined speed of the first and second foot pedals 102 and 104 represent how fast the cursor moves in this embodiment.

The mouse velocity $\vec{r}$ 302, is expressed in a normalized range of −1 and +1. FIG. 3 illustrates exemplary movements of a cursor on a screen, in accordance with one embodiment with the present invention. For example, the mouse velocity vector $\vec{r}_1$ 304 is a result of full pivot depression of the second foot pedal 104 in the forward position 202, or counter-clockwise direction (+1), and the first foot pedal 102 in the neutral position 200. The cursor then will move upward on the screen at its full speed. Likewise, when the first foot pedal 102 is fully depressed forward, or in a counter-clockwise direction, and the second foot pedal 104 is in a neutral position, the resultant mouse velocity vector $\vec{r}$ has a value of (+1, 0). The cursor will move to the right on the screen. When the first pedal 102 is fully depressed backward, or in a clockwise direction, and the second pedal 104 is in a neutral position, the resultant mouse velocity vector $\vec{r}$ has a value of (−1, 0). The cursor will then move to the left on the screen.

Another example is illustrated with a mouse velocity vector $\vec{r}_2$ 306. The mouse velocity vector $\vec{r}_2$ 306 represents half pivot depressions of both the first foot pedal 102 and the second foot pedal 104 in the backward position 204 or clockwise direction (−1). In this case, the cursor moves to 225° or 45° in the third quadrant. It should be noted that the velocity at which the cursor moves in the given direction is much slower compared to the velocity at which the cursor moves in association with the mouse velocity vector $\vec{r}_1$ 304.

In another embodiment of the present invention, the mouse velocity vector, $\vec{r}$, denotes a final destination of a cursor on a given screen. More specifically, the angular displacement of the first foot pedal 102 denotes the position of a cursor along the x-axis, and the angular displacement of the second foot pedal 104 denotes the position of the cursor along the y-axis. Thus, the resultant combination of the angular displacements of the first and second foot pedals 102 and 104 represents the final position of the cursor on the given screen. When the final destination is determined, the cursor then jumps directly to the designated position.

For example, if the user depresses the first pedals 102 fully in a counter clockwise direction, the resultant combination of the angular motion of the first and second foot pedals set the final destination of a cursor to (+1,0). The cursor then jumps directly to the designated position, (+1,0). This embodiment is particularly useful in graphic applications such as three dimensional Computer Aided Design and Computer Aided Manufacturing (3D CAD/CAM). In the aforementioned examples, the first foot pedal 102 is configured to provide pivoting or seesawing motion of the cursor along the x-axis, and the second foot pedal 104 is configured to provide pivoting or seesawing motion of the cursor along the y-axis. It should be understood, however, that pedal assignments and pivotal forces are configurable as needed by individual users.

Figure 4:
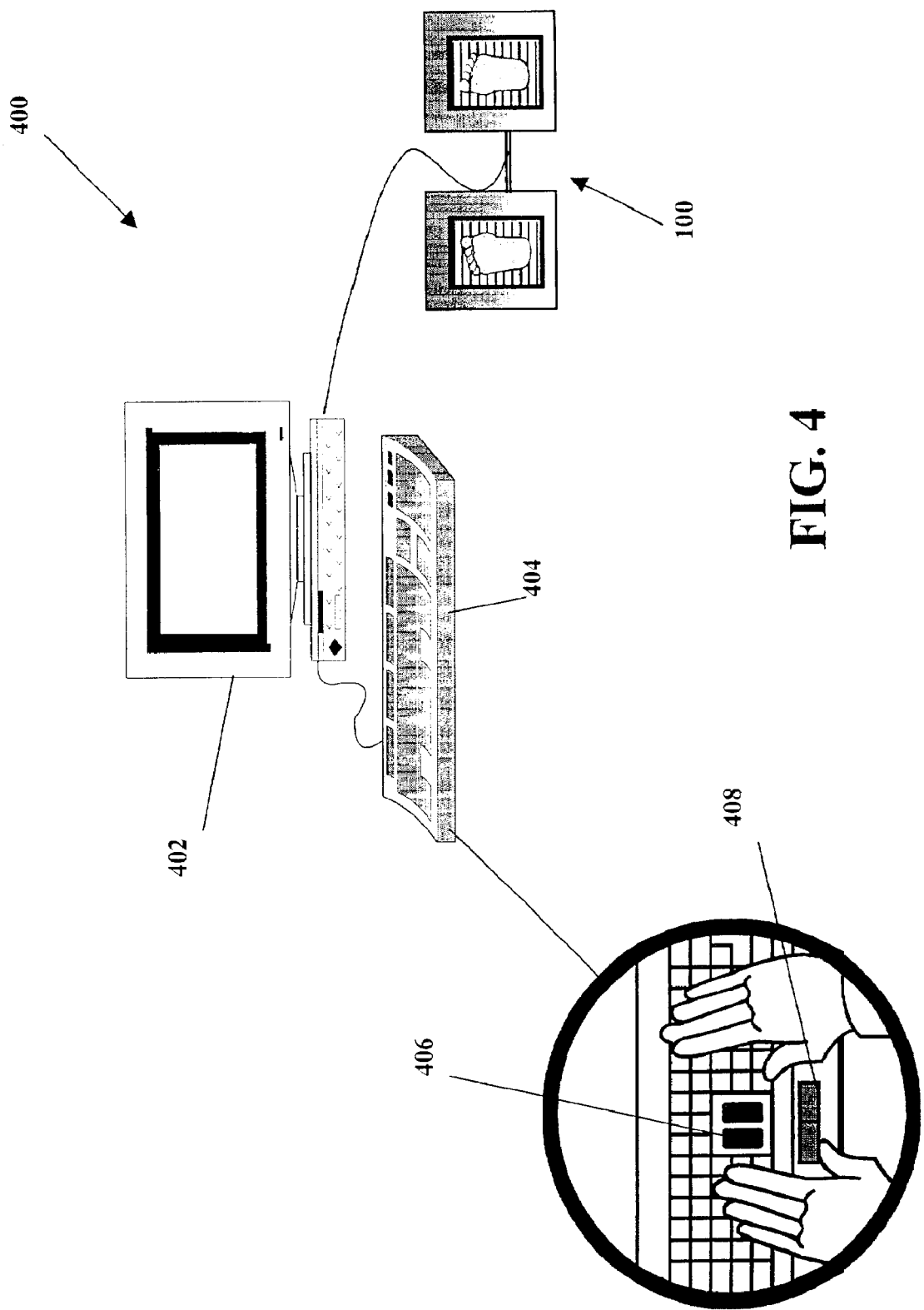
FIG. 4 is an exemplary computer system employing the foot-operated input control device that provides mouse buttons on a keyboard, in accordance with one embodiment of the present invention.

In the preferred embodiment of the present invention, mouse buttons on a conventional hand held mouse do not reside on the same device in the foot-operated input control device 100. Rather, the mouse buttons are assigned to pre-determined, easy to reach keys on a keyboard, or to specially added buttons on a conventional keyboard as is best illustrated in FIG. 4. FIG. 4 illustrates an exemplary computer system that provide the separation of mouse buttons from the input control device 400. The computer system 400 includes a general computer 402 connected to a keyboard 404 and the foot-operated input control device 100. Mouse buttons 408 are provided on the keyboard 402, thereby providing separation of the mouse buttons 408 from the foot-operated input control device 100. Such separation provides more freedom in the input control device design and enhances the efficiency and ergonomics of input control devices by not expecting the lower limbs to operate the mouse buttons.

Further, two extra lever buttons can also be provided (e.g. placed on the keyboard) to mimic the operations of the first and second foot pedals in addition to the foot pedals to provide the user with more options. In the preferred embodiment of the present invention, the two additional buttons associated would be smaller versions of the first and second foot pedals and could be placed where they are easily reached. More specifically, the foot-operated input control device 100 adapts two lever buttons 406 disposed where arrow keys or a touch pad now reside on the keyboard 404, so that they are easily accessible by the user's thumbs. Such additional lever buttons 406 will further reduce the travel time needed to access the mouse.

In accordance with one embodiment of the present invention, both the first and second foot pedals operate in a single plane. Thus, the foot pedals require only the 'up and down' motion of the feet, similar in operation to pedals on an organ or a motorcycle. In this way, the present invention minimizes effects on the back muscles without requiring fine motion of the feet and toes and an extensive hardware. The foot-operated input control device also reduces the need to move the hand from the keyboard to an off-keyboard mouse, which may increase the input speed and decrease strains on the user's wrist and shoulder. Also, as will be apparent to one skilled in the art, communication between the foot pedals and a general purpose computer can easily established through a peripheral driver or the equivalents thereof. Thus, the present invention can easily be implemented to the existing computers without requiring extensive labor and cost.

For illustration purposes, the foot-operated input control device is presented to operate in a single plane or in two-dimensions. However, it should be understood that the foot-operated input control device may include foot-pedals providing three-dimensional movements, whose motion can then be translated into two-dimensional movements. In addition, the present invention is presented in the context of an input control device that controls a cursor movement on a screen. However, it should be also understood that the foot-operated input control device can be adapted in other applications (e.g. surgical instruments, microscopes, cameras, factory automation machines, etc.), where the hands of operator or user thereof are likely to be tied up in other tasks, or the reduction of travel time is needed.

Those skilled in the art can appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

It is claimed that:

1. A cursor control apparatus including:
    a first pedal to control the movement of a cursor along an x-axis; and
    a second pedal to control the movement of the cursor along a y-axis;
    wherein the first pedal and the second pedal are configured for an angular motion to allow for both negative and positive velocities.

2. The apparatus of claim 1 further comprising a first base to support and provide pivoting motion of the first pedal, and a second base to support and provide pivoting motion of the second pedal.

3. The apparatus of claim 1 further comprising a keyboard including buttons for the cursor control apparatus to further reduce travel time.

4. The apparatus of claim 1 further comprising a first motion detector for detecting the degree of angular motion of the first pedal and a second motion detector for detecting the degree of angular motion of the second pedal.

5. The apparatus of claim 4, wherein the degree of angular motion detected by the first motion detector and the second motion detector are combined and translated into a velocity at which the cursor is to be moved.

6. A foot-operated input device comprising:
    a first pedal to determine a velocity of motion of a cursor along an x-axis; and
    a second pedal to determine a velocity of motion of the cursor along a y-axis,
    wherein the velocities of motion of the cursor along the x-axis and y-axis are combined to generate a r vector.

7. The device of claim 6 further comprising a first base to support and provide seesaw motion of the first pedal, and a second base to support and provide seesaw motion of the second pedal.

8. The device of claim 6, wherein each of the first and second pedals has a neutral position indicative of a zero velocity, a first position indicative of a positive velocity and a second position indicative of a negative velocity.

9. The device of claim 6 further comprising a keyboard including buttons for said foot-operated input device to further reduce travel time.

10. The device of claim 6, wherein the r vector represents the direction of the cursor and a velocity of the cursor is to move on a screen.

11. The device of claim 10 further comprising a first motion detector to detect an angular displacement of the first pedal and a second motion detector to detect an angular displacement of the second pedal, wherein the angular displacements of the first and second pedals are to be translated into a direction of movement of the cursor on the screen.

12. The device of claim 11, wherein the first motion detector is to determine a velocity of motion of the first pedal and the second motion detector is to determine a velocity of motion of the second pedal, wherein the velocities of motion of the first and second pedals are translated into a velocity of motion of the cursor on the screen.

13. A method for controlling a cursor comprising:
  determining an angular motion of a first pedal, wherein the first pedal controls movement of a cursor along an x-axis;
  determining an angular motion of a second pedal, wherein the second pedal controls movement of the cursor along a y-axis;
  combining the angular motion of the first and second pedals; and
  translating the combined angular motion of the first and second pedals into direction and velocity of motion of the cursor on a screen.

14. The method of claim 13, wherein each of the first and second pedals has a neutral position indicative of a zero velocity, a forward position indicative of a positive velocity and a backward position indicative of a negative velocity.

15. The method of claim 13, wherein determining the angular motion of the first pedal further, a speed and angular displacement of the first pedal is determined.

16. The method of claim 13, wherein determining the angular motion of a second pedal, a speed and angular displacement of the second pedal is determined.

* * * * *

UNITED STATES PATENT AND TRADEMARK OFFICE
CERTIFICATE OF CORRECTION

PATENT NO. : 6,980,133 B2
APPLICATION NO. : 10/053608
DATED : December 27, 2005
INVENTOR(S) : Annie P. Foong It is certified that error appears in the above-identified patent and that said Letters Patent is hereby corrected as shown below:

Column 6,
Line 46, "generate a r vector." should be -- generate an r vector. --.

Column 8,
Lines 8 and 11, "wherein determining the" should be -- wherein in determining the --.

Signed and Sealed this

Twentieth Day of June, 2006

JON W. DUDAS
*Director of the United States Patent and Trademark Office*